Oct. 15, 1929.                L. C. WETZEL                1,732,177
                            INDICATING DEVICE
                           Filed Sept. 14, 1926
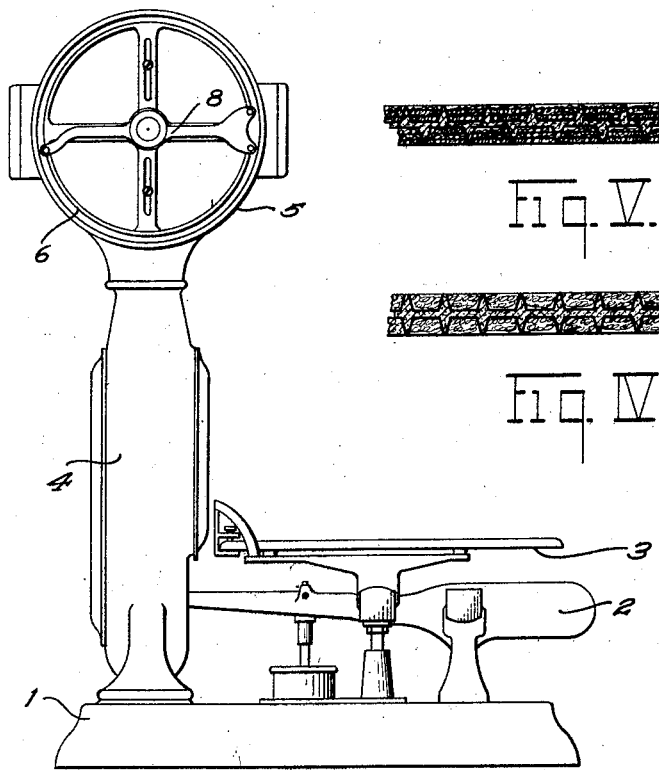
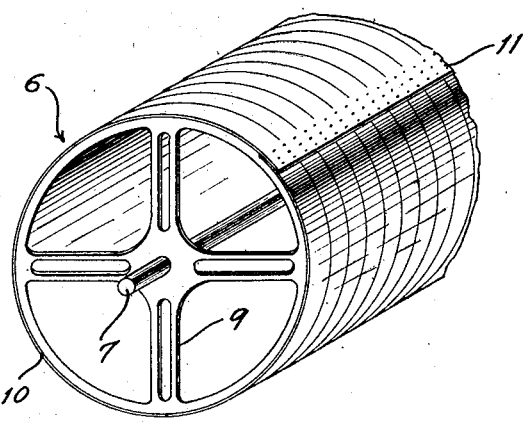
Inventor
LEWIS C. WETZEL
By C. O. Marshall,
Attorney Patented Oct. 15, 1929

1,732,177

UNITED STATES PATENT OFFICE

LEWIS C. WETZEL, OF TOLEDO, OHIO, ASSIGNOR TO TOLEDO SCALE COMPANY, OF TOLEDO, OHIO, A CORPORATION OF NEW JERSEY

INDICATING DEVICE

Application filed September 14, 1926. Serial No. 135,361.

This invention relates to indicating devices, and particularly to cylindrical computing charts for weighing scales, and one of its principal objects is to improve the means employed for connecting the edges of such charts.

Cylindrical computing charts for weighing scales are rotated by the weighing scale mechanism and in order that they may operate without appreciable friction it is necessary not only that they be mounted on the most sensitive bearings, but that they be of the lightest possible construction. For this reason they are commonly made of a spindle upon which are mounted skeleton spiders of aluminum surrounded by a sheet of paper. While such computing charts must be light in weight, it is necessary that they be of sturdy and lasting construction for the reason that they form important parts of weighing scales that are of the highest type of workmanship and the prices of which range as high as $300.00 or $400.00 each. It has been found that the best way to connect the edges of the sheet of paper forming the outer part of the chart is by means of certain lasting glues. The paper of which such charts are made is, however, of multi-ply formation and it sometimes happens that under some conditions of use the plies of the paper will separate at the edge of the chart and under some conditions of use the glued joint will tend to gape or open slightly. I prevent this by so connecting the edges that they are secured together not only by the adhesive force of the glue, but by small rivet-like projections which extend through the several plies of each end of the sheet.

Other objects and advantages will be apparent from the following description, in which reference is had to the accompanying drawings illustrating a preferred embodiment of my invention and wherein similar reference numerals designate similar parts throughout the several views.

In the drawings:—

Figure I shows a weighing scale embodying the form of chart to which my improvement is applied;

Figure II is an enlarged fragmentary perspective view of a part of a cylindrical weighing scale chart embodying my invention;

Figure III is a greatly enlarged detail sectional view showing a fragment of a chart prepared for the gluing operation;

Figure IV is a similarly enlarged fragmentary sectional view showing parts of ends of a chart connected together by the means of my invention; and Figure V is a similar view showing a slight modification of the connecting means.

Referring to the drawings in detail, the weighing mechanism of the scale is mounted on a base 1, and consists of a lever 2 carrying a commodity platform 3 and connected to load-counterbalancing mechanism (not shown) which is mounted in an upright housing 4. Surmounting the upright housing 4 is a casing 5 within which is mounted a cylindrical computing chart 6. The chart 6 consists of a spindle 7 adapted to be suitably mounted in anti-friction bearings (not shown) which are carried by brackets 8 mounted within the casing 5. Secured to the spindle 7 of the cylindrical chart are skeleton spiders 9 of aluminum or other light material. These skeleton spiders are surrounded by a sheet of paper 10, the edges of the sheet of paper being joined together, as at 11. Before joining the edges of the paper they are perforated, as shown at 12 in Figure III, the perforations being made by means of a small spiked wheel or by other convenient means. I prefer to make the perforations conical in shape, as shown in Figure III, in order that the ends on the outer surface of the chart may be substantially closed to prevent the glue from oozing through in considerable quantities and smearing the outer chart surface. It is within the scope of my invention, however, to make them cylindrical or of any other desired shape. When the glue is applied to the chart it not only forms a layer of adhesive between the overlapping ends, but it fills the perforations and thus binds the plies of the paper together and at the same time more securely connects the ends of the chart.

In Figure IV the perforations in the ends of the chart are shown as arranged opposite each other, while in Figure V they are offset or staggered. I have found it good practice, however, to put the perforations in each end of the chart without reference as to how the perforations at one end will be arranged with respect to the perforations at the other end when the ends are connected together. In Figure V the paper 10ª of the chart is shown as formed of three plies. A small projection of glue in the perforations extends through the plies and ties them together.

The embodiment of my invention herein shown and described is to be regarded as illustrative only, and it is to be understood that the invention is susceptible to variation, modification and change within the spirit and scope of the subjoined claims.

Having described my invention, I claim:

1. In a rotatable weighing scale chart, in combination, a spindle, spiders mounted thereon, a sheet of material surrounding said spiders, said sheet having overlapping portions, said overlapping portions being provided with depressions, and an adhesive lying between said overlapping portions and extending into said depressions.

2. In a rotatable weighing scale chart, in combination, a spindle, spiders mounted thereon, a sheet of comparatively non-porous material surrounding said spiders, said sheet having overlapping portions, said overlapping portions having depressions therein, and an adhesive substance lying between said overlapping portions and extending into said depressions.

3. In a rotatable weighing scale chart, in combination, a spindle, spiders mounted thereon, a sheet of comparatively non-porous material surrounding said spiders, said sheet having overlapping portions, said overlapping portions having cone-shaped depressions therein, and an adhesive substance lying between said overlapping portions and extending into said depressions.

4. In a rotatable weighing scale chart, in combination, a spindle, spiders mounted thereon, a sheet of comparatively non-porous material surrounding said spiders, said sheet having overlapping portions, said overlapping portions having perforations therein, and an adhesive substance lying between said overlapping portions and extending into said perforations.

5. In a rotatable weighing scale chart, in combination, a spindle, spiders mounted thereon, a multi-ply sheet of material surrounding said spiders, said sheet having overlapping portions, said overlapping portions having depressions extending through some of the plies thereof, and an adhesive lying between said overlapping portions and extending into said depressions.

6. In a rotatable weighing scale chart, in combination, a spindle, spiders mounted thereon, a multi-ply sheet of material surrounding said spiders, said sheet having overlapping portions, said overlapping portions having perforations extending through some of the plies thereof, and an adhesive lying between said overlapping portions and extending into said perforations.

7. In a rotatable weighing scale chart, in combination, a skeleton frame, a sheet of material rolled into the form of a cylinder with its edges overlapping, said cylinder surrounding said skeleton frame, said overlapping edges being provided with depressions, and an adhesive lying between said edges and extending into said depressions.

8. In a device of the class described, in combination, a chart consisting of a spindle upon which are mounted spiders, said spiders being surrounded by a sheet of material with its edges overlapping, the overlapping edges being provided with depressions, and an adhesive lying between said overlapping edges and extending into said depressions.

9. In a rotatable weighing scale chart, in combination a skeleton frame, a multi-ply sheet of material rolled into the form of a cylinder with its edges overlapping said cylinder surrounding said frame, said overlapping edges being provided with depressions, and an adhesive lying between said overlapping edges and extending into said depressions.

LEWIS C. WETZEL.